(12) United States Patent
Smith et al.

(10) Patent No.: US 12,373,765 B2
(45) Date of Patent: Jul. 29, 2025

(54) SYSTEM AND METHOD FOR PROVIDING UNIFORM TRACKING INFORMATION WITH A RELIABLE ESTIMATED TIME OF ARRIVAL

(71) Applicant: Walmart Apollo, LLC, Bentonville, AR (US)

(72) Inventors: Austin Lee Smith, Burlingame, CA (US); Ridhima Kaur Arora, South San Francisco, CA (US); Sandip Mahanta, Bengaluru (IN); Vidyanand Krishnan, Sunnyvale, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 96 days.

(21) Appl. No.: 18/104,042

(22) Filed: Jan. 31, 2023

(65) Prior Publication Data

US 2023/0177448 A1    Jun. 8, 2023

Related U.S. Application Data

(63) Continuation of application No. 16/289,560, filed on Feb. 28, 2019, now Pat. No. 11,620,608.

(51) Int. Cl.
*G06Q 10/0833* (2023.01)
*G06Q 10/0834* (2023.01)

(52) U.S. Cl.
CPC ..... *G06Q 10/0833* (2013.01); *G06Q 10/0834* (2013.01)

(58) Field of Classification Search
None
See application file for complete search history.

(56) References Cited

U.S. PATENT DOCUMENTS 7,263,668 B1   8/2007   Lentz
7,716,091 B2   5/2010   Ross
(Continued)

FOREIGN PATENT DOCUMENTS

CN    111369288 A    7/2020
EP    3876173 A1    9/2021
(Continued)

OTHER PUBLICATIONS

D. Kwak, R. Liu, D. Kim, B. Nath and L. Iftode, "Seeing is Believing: Sharing Real-Time Visual Traffic Information via Vehicular Clouds," in IEEE Access, vol. 4, pp. 3617-3631, 2016, doi: 10.1109/ACCESS.2016.2569585 (Year: 2016) Apr. 2016.
(Continued)

*Primary Examiner* — George Chen
*Assistant Examiner* — Duane N. Moore
(74) *Attorney, Agent, or Firm* — DICKINSON WRIGHT RLLP; Hector A. Agdeppa

(57) ABSTRACT

A method including receiving driver tracking information from a platform of a delivery driver network of multiple delivery driver networks. The method further can include determining a platform-dependent format of the driver tracking information; and when the platform-dependent format is different from a standard format, converting the driver tracking information from the platform-dependent format into uniform tracking information in the standard forma. Moreover, the method can include determining an estimated time of arrival; and verifying a reliability of an estimated delivery time of the driver tracking information. The method further can include when the reliability of the estimated delivery time is verified, incorporating the estimated delivery time into the uniform tracking information; and when the reliability of the estimated delivery time is not verified, incorporating the estimated time of arrival into the uniform (Continued)

tracking information as the estimated delivery time. The method further can include providing the uniform tracking information to be rendered on a user interface of a user device. Other embodiments are disclosed.

21 Claims, 8 Drawing Sheets

(56) References Cited

U.S. PATENT DOCUMENTS

| | | |
|---|---|---|
| 7,797,164 B2 | 9/2010 | Junger et al. |
| 8,104,682 B2 | 1/2012 | Junger |
| 8,429,019 B1 | 4/2013 | Yeatts |
| 8,831,975 B2 | 9/2014 | Golden |
| 8,965,791 B1 | 2/2015 | Bell |
| 9,393,981 B1 | 7/2016 | Lee et al. |
| 9,934,530 B1 | 4/2018 | Iacono |
| 10,127,517 B2 | 11/2018 | Carr |
| 10,176,448 B1 | 1/2019 | Rhodes |
| 10,346,889 B1 | 7/2019 | Reiss |
| 10,348,916 B2 | 7/2019 | Nagata |
| 10,366,338 B2 | 7/2019 | Bell |
| 10,366,381 B2 | 7/2019 | Bell |
| 10,410,194 B1 | 9/2019 | Grassadonia |
| 10,430,926 B1 | 10/2019 | Cook |
| 10,467,601 B1 | 11/2019 | Bricca |
| 10,636,019 B1 | 4/2020 | Abrons |
| 10,754,916 B1 | 8/2020 | Rehn |
| 10,778,598 B1 | 9/2020 | Fritz |
| 10,915,855 B2 | 2/2021 | Sharma |
| 10,997,645 B1 | 5/2021 | Philbin |
| 11,074,539 B2 | 7/2021 | Tiderington |
| 11,120,394 B2 | 9/2021 | Anderson |
| 11,244,299 B1 | 2/2022 | Pittack |
| 11,315,190 B1 | 4/2022 | Brandmaier |
| 2001/0037320 A1 | 11/2001 | Allport |
| 2002/0007299 A1 | 1/2002 | Florence |
| 2002/0046076 A1 | 4/2002 | Baillargeon |
| 2003/0177072 A1 | 9/2003 | Bared |
| 2004/0205568 A1 | 10/2004 | Breuel et al. |
| 2005/0043996 A1 | 2/2005 | Silver |
| 2005/0071758 A1 | 3/2005 | Ehrich |
| 2006/0149577 A1 | 7/2006 | Stashluk, Jr. et al. |
| 2006/0178951 A1 | 8/2006 | Rund, III |
| 2006/0235739 A1 | 10/2006 | Levis |
| 2007/0011017 A1 | 1/2007 | Field |
| 2007/0192200 A1 | 8/2007 | Weng |
| 2007/0198339 A1 | 8/2007 | Shen |
| 2007/0237096 A1 | 10/2007 | Vengroff |
| 2008/0221964 A1 | 9/2008 | Berkovitz et al. |
| 2009/0005987 A1* | 1/2009 | Vengroff ............ G06Q 30/0261 705/7.34 |
| 2009/0099965 A1 | 4/2009 | Grant |
| 2009/0106124 A1 | 4/2009 | Yang |
| 2010/0115040 A1 | 5/2010 | Sargent et al. |
| 2011/0004562 A1* | 1/2011 | Hennessy ............ G06Q 10/08 705/333 |
| 2012/0066008 A1 | 3/2012 | Scudder et al. |
| 2013/0185124 A1 | 7/2013 | Aaron |
| 2013/0198042 A1 | 8/2013 | Seifen |
| 2013/0246301 A1 | 9/2013 | Radhakrishnan |
| 2014/0025524 A1 | 1/2014 | Sims |
| 2014/0052613 A1 | 2/2014 | Tavakoli |
| 2014/0067499 A1 | 3/2014 | Stepanovich |
| 2014/0160143 A1 | 6/2014 | Ballestad et al. |
| 2014/0164126 A1 | 6/2014 | Nicholas et al. |
| 2014/0278635 A1 | 9/2014 | Fulton et al. |
| 2014/0351033 A1 | 11/2014 | Azevedo |
| 2015/0019384 A1 | 1/2015 | Fabian et al. |
| 2015/0039450 A1 | 2/2015 | Hemblad |
| 2015/0100433 A1 | 4/2015 | Choy et al. |
| 2015/0142594 A1 | 5/2015 | Lutnick |
| 2015/0154559 A1 | 6/2015 | Barbush |
| 2015/0161564 A1 | 6/2015 | Sweeney et al. |
| 2015/0178678 A1 | 6/2015 | Carr et al. |
| 2015/0178712 A1 | 6/2015 | Angrish |
| 2015/0186869 A1 | 7/2015 | Winters et al. |
| 2015/0193779 A1 | 7/2015 | Lima |
| 2015/0227890 A1 | 8/2015 | Bednarek et al. |
| 2015/0235304 A1 | 8/2015 | Vincent |
| 2015/0262121 A1 | 9/2015 | Riel-Dalpe |
| 2015/0324741 A1 | 11/2015 | Parry et al. |
| 2016/0071056 A1 | 3/2016 | Ellison et al. |
| 2016/0109251 A1 | 4/2016 | Thakur |
| 2016/0148300 A1 | 5/2016 | Carr et al. |
| 2016/0171439 A1 | 6/2016 | Ladden et al. |
| 2016/0171574 A1 | 6/2016 | Paulucci et al. |
| 2016/0180287 A1 | 6/2016 | Chan |
| 2016/0210591 A1 | 7/2016 | LaFrance |
| 2016/0232721 A1 | 8/2016 | Singh et al. |
| 2016/0238406 A1* | 8/2016 | Burtner ............ G06F 16/22 |
| 2016/0247113 A1 | 8/2016 | Rademaker |
| 2016/0257401 A1 | 9/2016 | Buchmueller |
| 2016/0290811 A1 | 10/2016 | Watterson et al. |
| 2016/0334797 A1 | 11/2016 | Ross |
| 2016/0343062 A1 | 11/2016 | Morton et al. |
| 2016/0350756 A1 | 12/2016 | Shepard et al. |
| 2016/0379167 A1 | 12/2016 | Raman |
| 2016/0379202 A1 | 12/2016 | Turner |
| 2017/0011340 A1 | 1/2017 | Gabbai |
| 2017/0024621 A1 | 1/2017 | Thompson et al. |
| 2017/0025012 A1 | 1/2017 | Thompson et al. |
| 2017/0039540 A1 | 2/2017 | Bell |
| 2017/0078504 A1 | 3/2017 | Nagata |
| 2017/0103490 A1 | 4/2017 | Haparnas |
| 2017/0116562 A1 | 4/2017 | Schroeder |
| 2017/0124511 A1 | 5/2017 | Mueller et al. |
| 2017/0154347 A1* | 6/2017 | Bateman ............ G06Q 40/08 |
| 2017/0236088 A1 | 8/2017 | Rao |
| 2017/0287086 A1 | 10/2017 | Lopez et al. |
| 2017/0356752 A1* | 12/2017 | Lobo ............ G01C 21/3415 |
| 2017/0357617 A1 | 12/2017 | Ekanayake et al. |
| 2018/0012151 A1 | 1/2018 | Wang |
| 2018/0025318 A1 | 1/2018 | Baggott |
| 2018/0039936 A1 | 2/2018 | Klechner et al. |
| 2018/0068374 A1 | 3/2018 | Turlay |
| 2018/0081374 A1* | 3/2018 | Nimchuk ............ G06Q 10/08355 |
| 2018/0089660 A1 | 3/2018 | Elliott |
| 2018/0095604 A1 | 4/2018 | Nguyen |
| 2018/0158090 A1 | 6/2018 | Glynn et al. |
| 2018/0165630 A1 | 6/2018 | Gifford |
| 2018/0174093 A1 | 6/2018 | Perez |
| 2018/0174101 A1 | 6/2018 | Mattingly |
| 2018/0190001 A1 | 7/2018 | Napier et al. |
| 2018/0240181 A1 | 8/2018 | Lopez et al. |
| 2018/0247261 A1 | 8/2018 | Smith |
| 2018/0268462 A1* | 9/2018 | Brown ............ G01S 19/13 |
| 2018/0276602 A1 | 9/2018 | Rivalto |
| 2018/0356823 A1 | 12/2018 | Cooper |
| 2018/0365637 A1 | 12/2018 | Smith et al. |
| 2018/0365638 A1 | 12/2018 | Chen et al. |
| 2018/0365644 A1 | 12/2018 | Smith |
| 2018/0365725 A1 | 12/2018 | Smith |
| 2019/0019244 A1 | 1/2019 | Bangash |
| 2019/0051174 A1* | 2/2019 | Haque ............ G08G 1/202 |
| 2019/0066516 A1 | 2/2019 | Kuhara |
| 2019/0080275 A1 | 3/2019 | Brownell |
| 2019/0087778 A1 | 3/2019 | Evans, Jr. |
| 2019/0114666 A1 | 4/2019 | Kohli |
| 2019/0121522 A1 | 4/2019 | Davis et al. |
| 2019/0130086 A1 | 5/2019 | Tovey |
| 2019/0138983 A1 | 5/2019 | Endo |
| 2019/0156358 A1 | 5/2019 | Pace |
| 2019/0160994 A1 | 5/2019 | Letson |
| 2019/0164118 A1 | 5/2019 | Sandberg |
| 2019/0164144 A1 | 5/2019 | Hebert |
| 2019/0166009 A1 | 5/2019 | Parvin |
| 2019/0205857 A1 | 7/2019 | Bell |
| 2019/0244448 A1 | 8/2019 | Alamin |
| 2019/0251504 A1 | 8/2019 | Spillman |
| 2019/0251621 A1 | 8/2019 | Harmon |
| 2019/0255573 A1 | 8/2019 | Chen |
| 2019/0287063 A1 | 9/2019 | Skaaksrud |

(56) References Cited

U.S. PATENT DOCUMENTS

| | | |
|---|---|---|
| 2019/0297467 A1 | 9/2019 | Vengroff |
| 2019/0378080 A1 | 12/2019 | Srinivasan |
| 2019/0378081 A1 | 12/2019 | Swartz |
| 2020/0082459 A1 | 3/2020 | Varma |
| 2020/0151631 A1 | 5/2020 | Lamers |
| 2020/0151660 A1 | 5/2020 | Warr |
| 2020/0160428 A1 | 5/2020 | Calvo |
| 2020/0250721 A1 | 8/2020 | Dana |
| 2020/0273431 A1 | 8/2020 | Dong et al. |
| 2021/0064824 A1 | 3/2021 | Ranatunga |
| 2021/0089995 A1 | 3/2021 | Iacono |
| 2021/0090017 A1 | 3/2021 | Reiss et al. |
| 2021/0097590 A1 | 4/2021 | Canseco |
| 2021/0133724 A1 | 5/2021 | Harris |
| 2021/0142391 A1 | 5/2021 | Van Horne |
| 2021/0255985 A1 | 8/2021 | Schneider |
| 2021/0365885 A1 | 11/2021 | Timonen |
| 2022/0058613 A1 | 2/2022 | Maxwell |

FOREIGN PATENT DOCUMENTS

| | | |
|---|---|---|
| WO | 0175746 A2 | 10/2001 |
| WO | 0198869 A2 | 12/2001 |
| WO | 2005072328 A2 | 8/2005 |
| WO | 2012050579 A1 | 4/2012 |
| WO | 2015084688 A1 | 6/2015 |
| WO | 2017197468 A1 | 11/2017 |
| WO | 2019198858 A1 | 10/2019 |
| WO | 2020054118 A1 | 3/2020 |
| WO | 2020207418 A1 | 10/2020 |
| WO | 2020240731 A1 | 12/2020 |

OTHER PUBLICATIONS

Joseph Pisani, "Should you tip the Uber driver? Here's what to give them", published by Taiwan News, on Jul. 28, 2016 (year: 2016) Jul. 28, 2016.

Meyersohn, Nathaniel, "Kroger Launches Online Grocery Delivery Service," Published Aug. 1, 2018, Accessed from Aug. 2, 2018, CNN Money, https://money.cnn.com/2018/08/01/news/companies/kroger-ship-grocery-delivery/index.html (Year: 2018). 2018.

Rouges, J., "Crowdsourcing delivery: New Interconnected Business Models to Reinvent Delivery," published by 1st Intl Physical Internet Conference 2014.

\* cited by examiner

SYSTEM AND METHOD FOR PROVIDING UNIFORM TRACKING INFORMATION WITH A RELIABLE ESTIMATED TIME OF ARRIVAL

CROSS-REFERENCE TO RELATED APPLICATIONS

This application is a continuation of U.S. patent application Ser. No. 16/289,560, filed Feb. 28, 2019. U.S. patent application Ser. No. 16/289,560 is incorporated herein by reference in its entirety.

TECHNICAL FIELD

This disclosure relates generally to providing tracking information in a standard format, independent from the multiple independent platforms providing the tracking information.

BACKGROUND

Tracking delivery of online orders is a common practice of online shopping. Grocery stores that provide delivery service to customers generally rely on one or more third party delivery driver networks for delivering grocery orders and providing driver tracking information. When a grocery store uses more than one third party delivery driver networks, the driver tracking information provided by different delivery driver networks can comprise different information in different formats because these delivery driver networks are separate entities and use various hardware and software platforms. Because the delivery driver network used for each grocery delivery for the same customer can be different, the user experience of tracking the grocery delivery can be inconsistent and/or confusing. Therefore, systems and methods for the grocery stores to provide uniform tracking information and consistent user experience are desired.

BRIEF DESCRIPTION OF THE DRAWINGS

To facilitate further description of the embodiments, the following drawings are provided in which.

Figure 1:
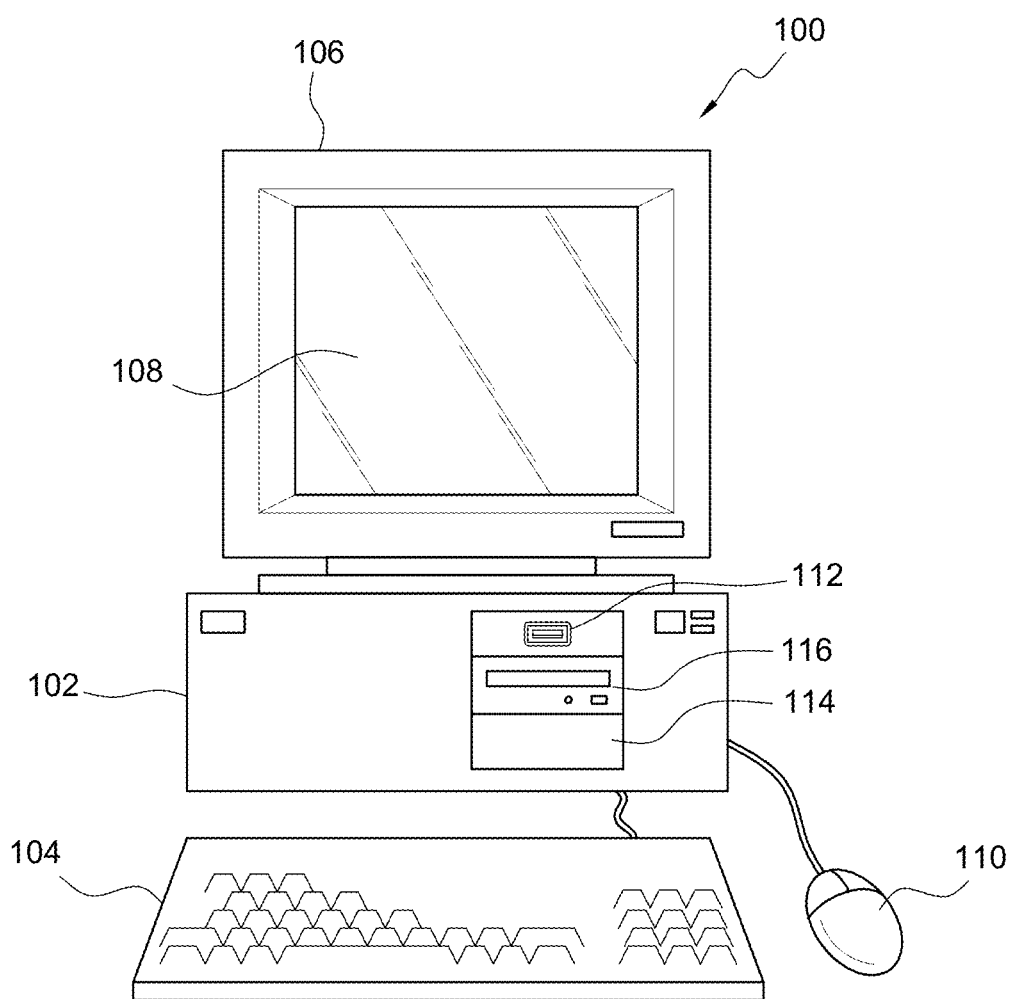
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, five seconds, ten seconds, thirty seconds, one minute, five minutes, ten minutes, or fifteen minutes.

DESCRIPTION OF EXAMPLES OF EMBODIMENTS

Figure 2:
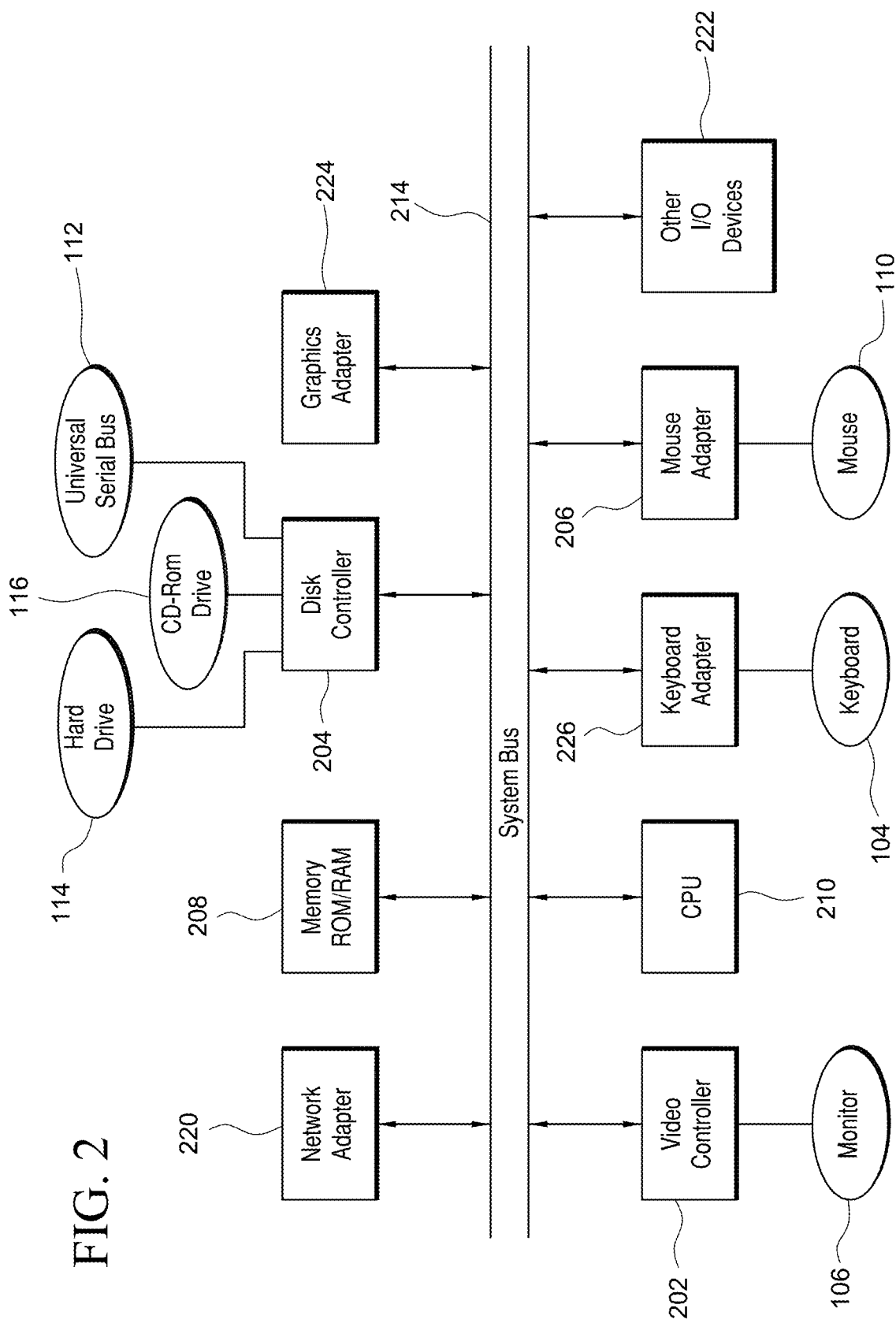
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refers to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can includes one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 100) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
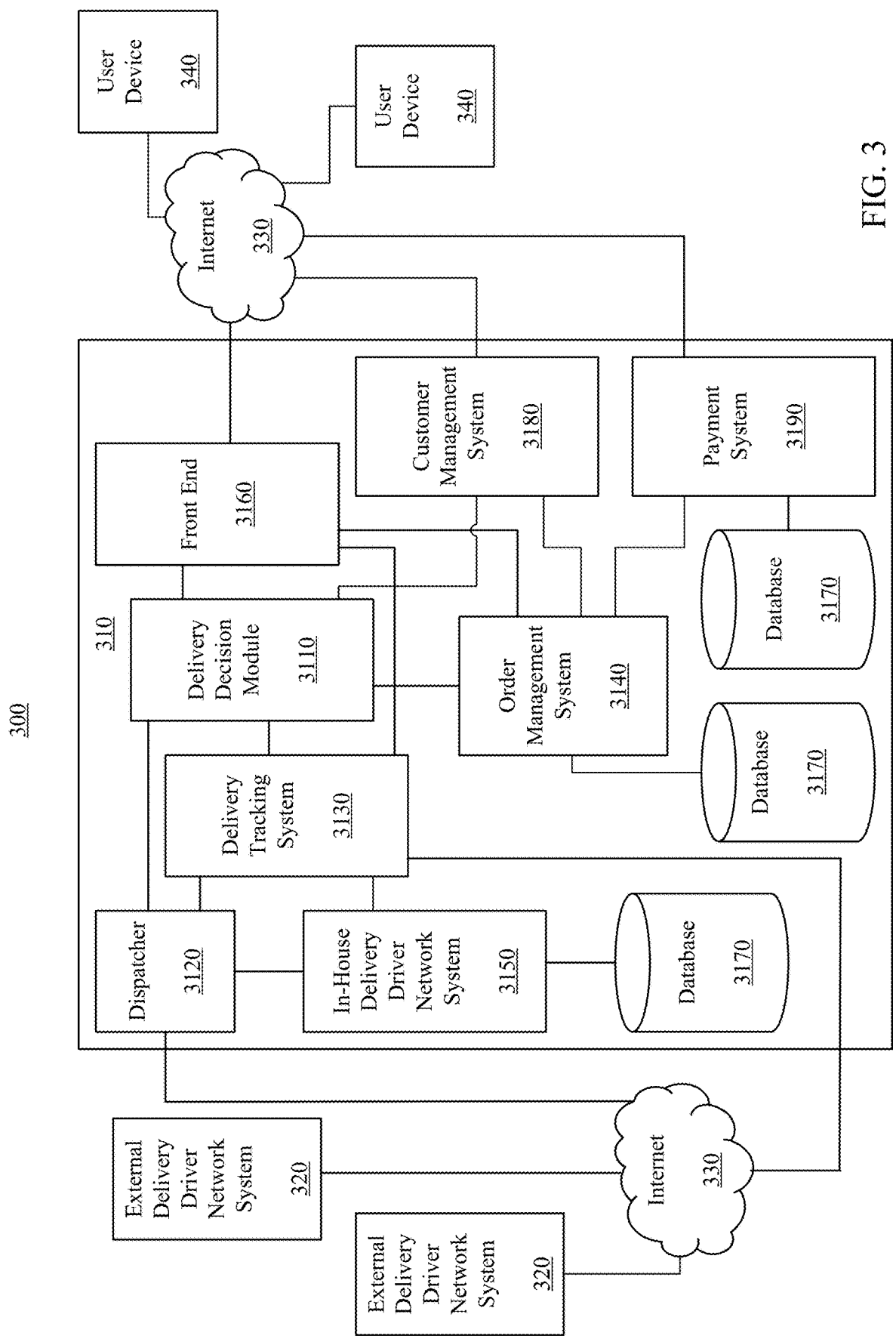
FIG. 3 illustrates a system for providing tracking information for grocery delivery to customers, according to an embodiment.

Turning ahead in the drawings, FIG. 3 illustrates a block diagram for a system 300, according to an embodiment. In many embodiments, system 300 can comprise an online grocery system, such as grocery system 310, multiple external delivery driver network systems, such as external delivery service provider systems 320, a computer network, such as Internet 330, and one or more user devices, such as user devices 340. In some embodiments, grocery system 310 can be configured to dispatch a delivery driver selected from multiple delivery driver networks to deliver a grocery order and provide uniform tracking information, in response to a user request, no matter which delivery driver network is used. System 300 and grocery system 310 are merely exemplary, and embodiments of system 300 and grocery system 310 are not limited to the embodiments presented herein. For example, grocery system 310 can be a system for a general online retailer, or an online marketplace, etc.

System 300 and grocery system 310 can be employed in many different embodiments or examples not specifically depicted or described herein. In some embodiments, certain elements, modules, or systems of system 300 and grocery system 310 can perform various procedures, processes, and/or activities. In other embodiments, the procedures, processes, and/or activities can be performed by other suitable elements, modules, or systems of system 300 and grocery system 310. Systems 300 and grocery system 310 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 and grocery system 310 described herein.

In many embodiments, grocery system 310 can comprise delivery decision module 3110, dispatcher 3120, delivery tracking system 3130, order management system 3140, in-house delivery driver network system 3150, front end 3160, one or more databases 3170, customer management system 3180, and payment system 3190. In the embodiment illustrated in FIG. 3, Internet 330 is coupled to external delivery driver network systems 320, user devices 340, and grocery system 310 (via at least dispatcher 3120, delivery tracking system 3130, front end 3160, customer management system 3180, and payment system 3190). In this embodiment, one or more databases 3170 are coupled to order management system 3140, in-house delivery driver network system 3150, and payment system 3190.

In many embodiments, grocery system 310 can be in data communication through Internet 330 with one or more external delivery driver network systems, such as external delivery driver network systems 320, and/or one or more user computers, such as user devices 340. Internet 330 can be a public or private network, such as an intranet. In many embodiments, grocery system 310 and external delivery driver network systems 320 are separate computer systems and operate on different platforms. In some embodiments, user devices 340 can be used by users, which also can be referred to as customers. In some embodiments, grocery system 310 can be in data communication with user devices 340 through front end 3160 via Internet 330, and front end 3160 can include one or more apps and/or one or more websites hosted by a web server that hosts one or more other websites. In many embodiments, an internal network that is not open to the public (and that is separate from Internet 330) can be used for communications among delivery decision module 3110, dispatcher 3120, delivery tracking system 3130, order management system 3140, in-house delivery driver network system 3150, front end 3160, one or more databases 3170, customer management system 3180, and payment system 3190. In these or other embodiments, an operator and/or administrator of grocery system 310 can manage grocery system 310, the computer processor(s) of grocery system 310, and/or the memory storage unit(s) of grocery system 310 using the input device(s) and/or display device(s) of grocery system 310.

In many embodiments, order management system 3140 can further comprise one or more of: delivery decision module 3110, customer management system 3180, payment system 3190, and/or one or more databases 3170. In many embodiments, dispatcher 3120 also can comprise delivery tracking system 3130, in-house delivery driver network system 3150, and/or one or more database 3170. Grocery system 310, delivery decision module 3110, dispatcher 3120, delivery tracking system 3130, order management system 3140, in-house delivery driver network system 3150, front end 3160, one or more databases 3170, customer management system 3180, and/or payment system 3190 can each be a computer system, such as computer system 100 (FIG. 1), as described above, and can each be a single computer, a single server, or a cluster or collection of computers or servers, or a cloud of computers or servers. In other embodiments, a single computer system can host multiple portions of, or all of, grocery system 310.

In certain embodiments, user devices 340 can be implemented with desktop computers, laptop computers, a mobile device, and/or other endpoint devices used by one or more users, respectively. A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Palm® operating system by Palm, Inc. of Sunnyvale, California, United States, (iv) the Android™ operating system developed by the Open Handset Alliance, (v) the Windows Mobile™ operating system by Microsoft Corp. of Redmond, Washington, United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can include a mobile device, and vice versa. However, a wearable user computer device does not necessarily include a mobile device, and vice versa.

In specific examples, a wearable user computer device can include a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can include (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, New York, United States of America. In other specific examples, a head mountable wearable user computer device can include the Virtual Retinal Display™ product, or similar product by the University of Washington of Seattle, Washington, United States of America. Meanwhile, in further specific examples, a limb mountable wearable user computer device can include the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

In many embodiments, system 300, grocery system 310, delivery decision module 3110, dispatcher 3120, delivery tracking system 3130, order management system 3140, in-house delivery driver network system 3150, front end 3160, one or more databases 3170, customer management system 3180, and/or payment system 3190 can each include one or more input devices (e.g., one or more keyboards, one or more keypads, one or more pointing devices such as a computer mouse or computer mice, one or more touchscreen displays, a microphone, etc.), and/or can each include one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to system 300, grocery system 310, delivery decision module 3110, dispatcher 3120, delivery tracking system 3130, order management system 3140, in-house delivery driver network system 3150, front end 3160, one or more databases 3170, customer management system 3180, and/or payment system 3190 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of system 300, grocery system 310, delivery decision module 3110, dispatcher 3120, delivery tracking system 3130, order management system 3140, in-house delivery driver network system 3150, front end 3160, one or more databases 3170, customer management system 3180, and/or payment system 3190. In a similar manner, the processors and/or the non-transitory computer-readable media can be local and/or remote to each other.

Meanwhile, in many embodiments, system 300, grocery system 310, delivery decision module 3110, dispatcher 3120, delivery tracking system 3130, order management system 3140, in-house delivery driver network system 3150, front end 3160, customer management system 3180, and/or payment system 3190 each also can be configured to communicate with and/or include one or more databases, such as databases 3170, and/or other suitable databases. The one or more databases can include an in-house delivery fleet management database that contains information about drivers, vehicles, shifts, delivery status, and so on. The one or more databases can further include an online grocery order database that contains information about orders received, payment status, pickup or delivery, customer information, items associated with the orders, and so on. The one or more databases also can include payment database that contains payment method, amount, associated orders, etc. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between system 300, grocery system 310, delivery decision module 3110, dispatcher 3120, delivery tracking system 3130, order management system 3140, in-house delivery driver network system 3150, front end 3160, one or more databases 3170, customer management system 3180, payment system 3190, external delivery driver network systems 320, and/or user devices 340 can be implemented using any suitable manner of wired and/or wireless communication. Accordingly, system 300, grocery system 310, delivery decision module 3110, dispatcher 3120, delivery tracking system 3130, order management system 3140, in-house delivery driver network system 3150, front end 3160, one or more databases 3170, customer management system 3180, and/or payment system 3190 can each include any software and/or hardware components configured to implement the wired and/or wireless communication.

Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

Figure 4:
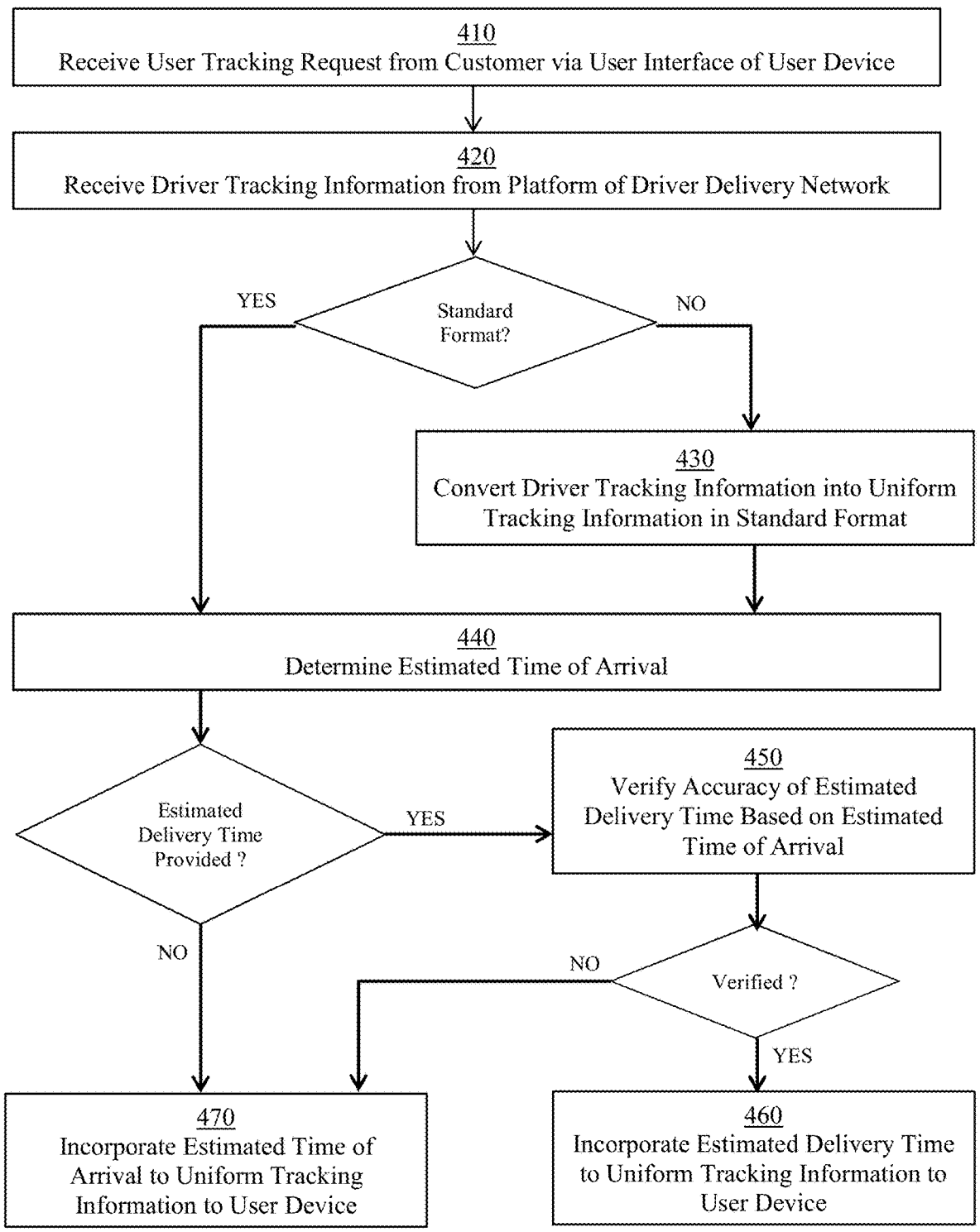
FIG. 4 illustrates a flow chart for a method for standardizing driver tracking information received from different platforms into uniform tracking information and ensuring the accuracy of the tracking information before providing the uniform tracking information to customers, according to another embodiment.
Figure 5:
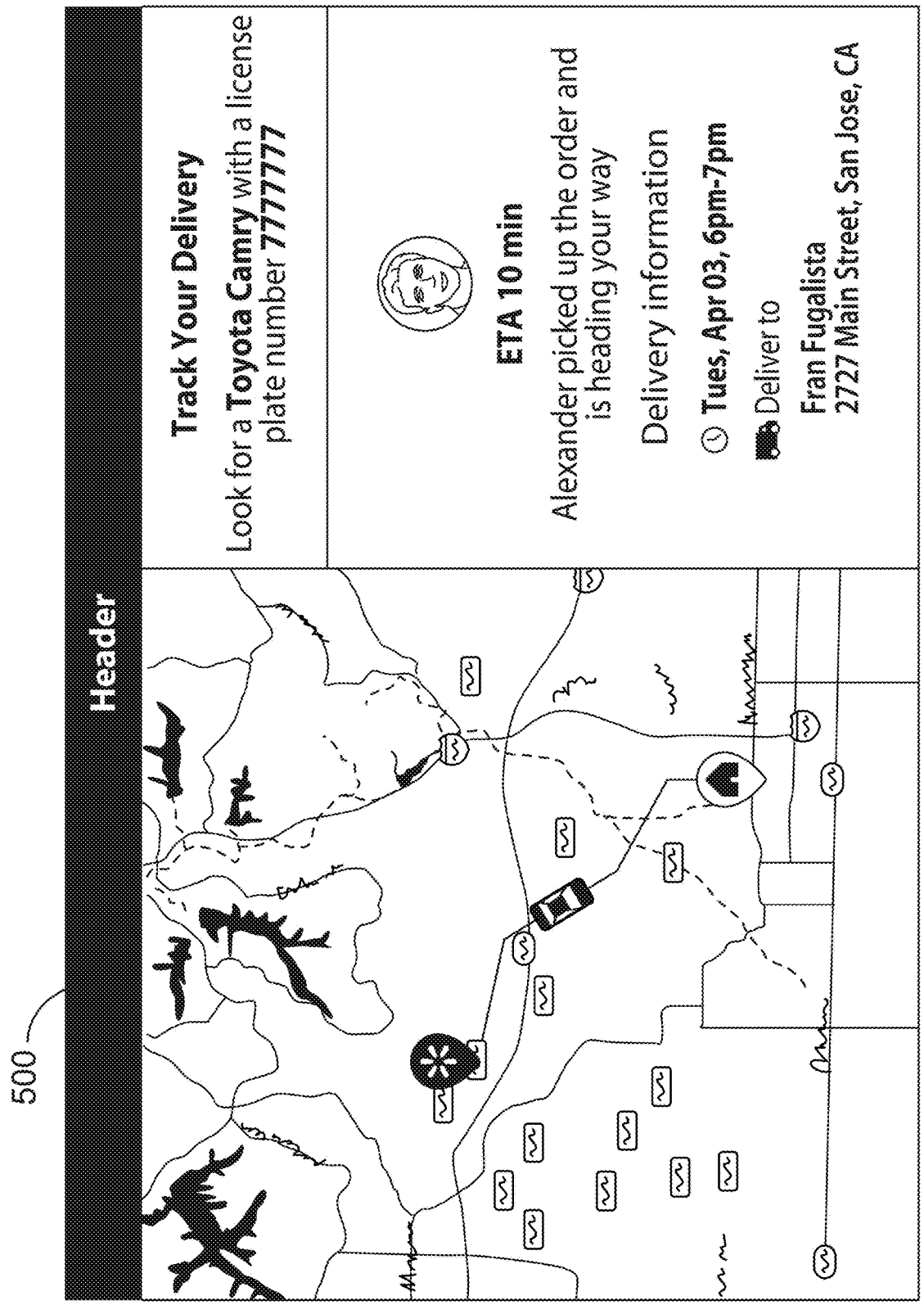
FIG. 5 illustrates an exemplary user interface for tracking a grocery delivery, according to another embodiment.
Figure 6:
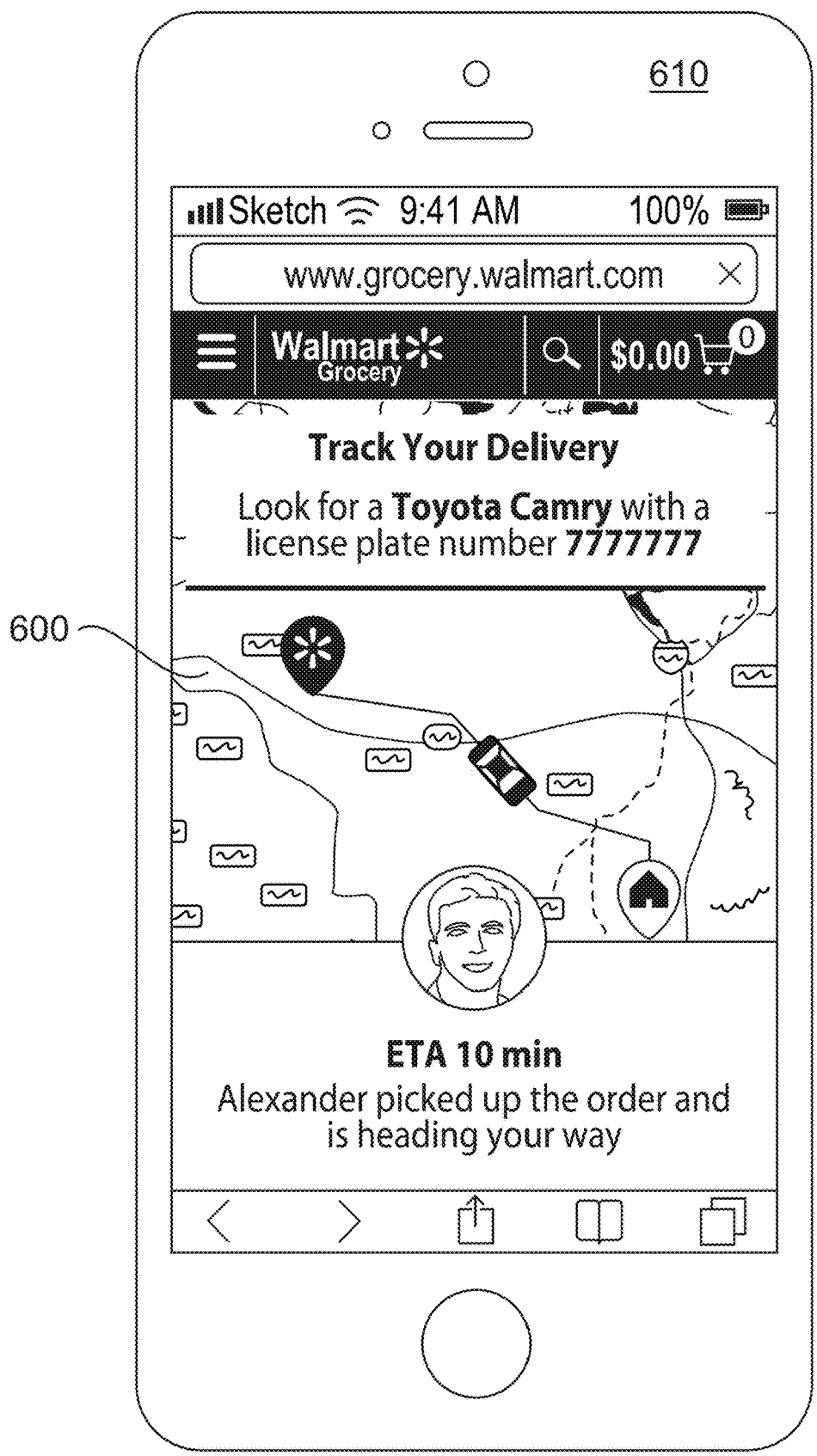
FIG. 6 illustrates another exemplary user interface for tracking the grocery delivery, according to another embodiment.

Turning ahead in the drawings, FIG. 4 illustrates a flow chart for a method 400, according to an embodiment. In many embodiments, method 400 can be a method for providing uniform tracking information with a reliable estimated time of arrival, in standard format, to customers. In many embodiments, the uniform tracking information is generated based on driver tracking information received from different hardware and software platforms of multiple delivery driver network systems. In many embodiments, different delivery driver network systems provide driver tracking information in various, non-standard formats, and not every delivery driver network system of these delivery driver network systems is configured to provide an estimated delivery time.

Method 400 is merely exemplary and is not limited to the embodiments presented herein. Method 400 can be employed in many different embodiments or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped.

In many embodiments, grocery system 310 (FIG. 3) and/or delivery tracking system 3130 (FIG. 3) can be suitable to perform method 400 and/or one or more of the activities of method 400. In these or other embodiments, one or more of the activities of method 400 can be implemented as one or more computing instructions configured to run at one or more processors and configured to be stored at one or more non-transitory computer readable media. Such non-transitory computer readable media can be part of a computer system such as grocery system 310 (FIG. 3) or delivery tracking system 3130 (FIG. 3). The processor(s) can be similar or identical to the processor(s) described above with respect to computer system 100 (FIG. 1).

In many embodiments, method 400 can receive a user tracking request from a customer via a user interface of a user device (block 410). In many embodiments, the user tracking request can be related to a grocery delivery of a grocery order, and the grocery delivery is to be sent from a grocery store location of a grocery store to a destination location. In other embodiments, the user tracking request can be related to delivery of other types of orders, and the delivery can be sent from a warehouse, a department store, general retailers, and so forth, to the destination location. In many embodiments, the user device can be similar or identical to user devices 340 (FIG. 3) or computer system 100 (FIG. 1).

In many embodiments, method 400 can be configured to select a driver from a delivery driver network of multiple delivery driver networks for the grocery delivery. In many embodiments, the systems of the multiple delivery driver networks, such as external delivery driver network systems 320 (FIG. 3) and/or in-house delivery driver network system 3150 (FIG. 3), can each comprise different software programs and operate on different hardware and software platforms. In many embodiments, the systems of the multiple delivery driver networks, such as external delivery driver network systems 320 (FIG. 3) and/or in-house delivery driver network system 3150 (FIG. 3), can be separate from the system performing method 400, such as grocery system 310 (FIG. 3) or delivery tracking system 3130 (FIG. 3).

In many embodiments, when the driver for the grocery delivery is selected, method 400 can receive driver tracking information from the platform of the driver delivery network (block 420). In many embodiments, method 400 can be configured to request and receive the driver tracking information from the system of the driver delivery network, such as external delivery driver network systems 320 (FIG. 3) and in-house delivery driver network system 3150 (FIG. 3), can be configured to push the driver tracking information. In some embodiments, method 400 can request driver tracking information upon the receipt of the user tracking request. In these or other embodiments, method 400 can be configured to automatically request (i.e., a pull request made to the system of the driver delivery network) or to automatically receive (i.e., a push from the system of the driver delivery network) the driver tracking information every 2 minutes, every minute, twice a minute, every 15 seconds, etc. In these or other embodiments, method 400 can be configured to send (via a push to the user device, or a pull from the user device) driver tracking information to the user device when the customers subscribe to automatic driver tracking.

In many embodiments, method 400 can provide one or more user interfaces configured to be rendered on the user device for the user to enter and submit the user tracking request. In some embodiments, the user interfaces can include a webpage on a website, such as front end 3160 (FIG. 3), adapted to be displayed on the user device, such as user device 340 (FIG. 3), and/or an app installed and executed on the user device. In some embodiments, the user interfaces for submitting the user tracking request can be part of user interfaces that are further configured to present the tracking information and submit other user commands, such as grocery orders, delivery requests, online return or refund requests, and/or customer reviews or feedback. In these or other embodiments, the user interfaces can comprise a set of control elements for various input options, including a selection of pending orders for requesting delivery tracking information; a choice of subscription to automatic push notices, types of the push notices, frequency of such push notices, and/or cancelation of push notices; and so forth.

In many embodiments, the driver tracking information provided by the delivery driver networks can comprise an estimated delivery time of the grocery delivery, a geographic location of the driver, a delivery route of the driver, and a time the delivery driver network provides the aforementioned information. In some embodiments, the driver tracking information can further comprise other information about the driver and/or the vehicle for the grocery delivery, such as the first name, or the nickname, of the driver, the photograph of the driver, the license plate number of the vehicle, and/or the make, model, and color of the vehicle.

In many embodiments, once the driver tracking information is received from the system or platform of the delivery driver network, method 400 can determine whether the driver tracking information is in a standard format. If the driver tracking information is not in standard format, in many embodiments, method 400 can be configured to convert the driver tracking information into the uniform tracking information in standard format (block 430). For example, the delivery driver networks and the driver tracking information provided by each of the delivery driver network for the same exemplary grocery delivery can comprise different information and be in different formats and/or orders:

| | |
|---|---|
| Delivery Driver Network #1 | "location": {<br>   "lat": 47.894844,<br>   "lng": −122.22922<br>},<br>"estimated_delivery_time": "2019-02-08T05:17:43.623508Z",<br>"updated_at": "2019-02-08T03:10:12.368683Z" |
| Delivery Driver Network #2 | "lat": 47.894844,<br>"lng": −122.22922,<br>"happened_at": 1549621212,<br>"accuracy": 19.721 |
| Delivery Driver Network #3 | "latitude": 47.894844,<br>"longitude": −122.229220,<br>"occurred at": "2019-02-08T03:10:12Z",<br>"eta": "2019-02-08T05:43:55Z" |

In an exemplary embodiment, method 400 can convert the driver tracking information into a standard format:

| | |
|---|---|
| Delivery Driver Network #1 | "latitude": 47.894844,<br>"longitude ": −122.22922,<br>"estimated_delivery_time": 1549603063,<br>"receivedTimestamp": 1549595412 |
| Delivery Driver Network #2 | "latitude": 47.894844,<br>"longitude ": 22.22922,<br>"estimated_delivery_time": ,<br>"receivedTimestamp": 1549621212 |
| Delivery Driver Network #3 | "latitude": 47.894844,<br>"longitude ": −122.22922,<br>"estimated_delivery_time": 1549595412,<br>"receivedTimestamp": 1549604635 |

In many embodiments, when the driver tracking information is in the standard format, method 400 can then determine an estimated time of arrival (block 440), based on the standard driver tracking information and/or real-time traffic information in the geographic area covering the delivery route, including the grocery store location, the destination location, and the driver geographic location. In many embodiments, method 400 can be in data communication with a third-party system, configured to provide a time of arrival estimated based on the standard driver tracking information, and can receive the estimated time of arrival from the third-party system. In other embodiments, method 400 can comprise computing instructions to calculate the estimated time of arrival based on the driver tracking information and the real-time traffic information of the geographic area, provided by the third-party system or other third-party system(s). The third party system and/or other third-party system(s) can be operated by third-party vendors, or local, federal, or central authorities in charge of traffic monitoring.

Further, in some embodiments, method 400 also can be configured to determine the estimated time of arrival based on an estimated speed of the driver. In these or other embodiments, the estimated speed of the driver can be determined based on: (a) the driver geographic location, (b) a prior driver geographic location of a prior driver tracking information received from the platform of the driver delivery network, (c) a timestamp of the driver tracking information, (d) a prior timestamp of the prior driver tracking information. The timestamp is greater than the prior timestamp. That is, the prior driver tracking information is received prior in time than the driver tracking information. In some embodiments where method 400 receives updated driver tracking information every minute (or more frequently), the prior driver tracking information can be received a minute (or earlier) before the driver tracking information is received. In some embodiments, method 400 can further use the delivery route of the driver tracking information in the determination of the estimated speed of the driver to take into consideration the turns and/or curves along the delivery route.

In some embodiments, when the driver geolocation location remains unchanged for a predetermined period, such as 5 minutes, 10 minutes, or so, due to loss of connection between the driver and the delivery driver network, method 400 can determine, based on the real-time traffic information, that the driver is not likely stuck in the traffic and further use the latest estimated speed of the driver, before the loss of updates from the driver occurs, to determine the current driver geographic location and generate the uniform tracking information to be rendered on the user interface of the user device. In similar embodiments, when the system of these embodiments is disconnected with the system of the delivery driver network, method 400 also can use the latest estimated speed of the driver, before the disconnection, to provide updated uniform tracking information.

In many embodiments, some of the multiple delivery driver network systems, such as external delivery driver network systems 320 (FIG. 3) and/or in-house delivery driver network system 3150 (FIG. 3), can provide estimated delivery time for the grocery order in the driver tracking information, while the rest of the multiple delivery driver network systems do not have such information in the driver tracking information provided. In many embodiments, when the driver tracking information comprises an estimated delivery time, method 400 can further be configured to verify whether the estimated delivery time is accurate or reliable (block 450) by comparing the estimated delivery time with the estimated time of arrival determined as above. In many embodiments, method 400 can compare the estimated delivery time and the estimated time of arrival to determine a first difference between the estimated delivery time and the estimated time of arrival and compare the first difference to a discrepancy threshold, such as 1 minute, 2 minutes, 3 minutes, 5 minutes, or 10 minutes, etc. In many embodiments, when the first difference between the estimated delivery time and the estimated time of arrival is less than the discrepancy threshold, method 400 can determined that the estimated delivery time is sufficiently accurate and thus verified.

In some embodiments, when the first difference between the estimated delivery time and the estimated time of arrival is not less than the discrepancy threshold, method 400 can be configured to repeat the verifying process, at least once, to rule out the possibility that rather than the estimated delivery time received from the platform of delivery driver network, it is the estimated time of arrival calculated by the system that is not reliable. For example, in an embodiment, if the estimated delivery time is not verified in the first verifying process, as stated above, method 400 can be configured to update the driver tracking information from the platform of the delivery driver network, convert the updated driver tracking information into the uniform tracking information in the standard format again, if needed, and determine an updated estimated time of arrival, based on the updated driver tracking information and the real-time traffic information. In this embodiment, method 400 can determine a second difference between the original estimated delivery time and the updated estimated time of arrival, and also can determine a third difference between the updated estimated delivery time of the updated driver tracking information and the updated estimated time of arrival. If either the second difference or the third difference is less than discrepancy threshold, in such embodiments, method 400 in these embodiments can determine that the estimated delivery time, as updated, is accurate and therefore, verified. In other embodiments, method 400 can determine that the updated estimated delivery time is verified only when both the second difference and the third difference are less than discrepancy threshold; otherwise, the updated estimated delivery time is not verified.

The conditions of "less than" in some embodiments can include the "equal" condition, while in other embodiments, the "equal" condition is part of the condition of "greater than." For example, in some embodiments, when the first difference is either equal to, or less than, the discrepancy threshold, method 400 can determine that the estimated delivery time is verified. In other embodiments, method 400 can determine that the estimated delivery time is not verified unless the first difference is less than, but not equal to, the discrepancy threshold.

In many embodiments, when the estimated delivery time is provided and verified, method 400 can incorporate the estimated delivery time, in standard format, to the uniform tracking information to be rendered on the user interface of the user device (block 460). In these or other embodiments, when the estimated delivery time is not provided or provided but not verified, method 400 can instead incorporate the estimated time of arrival into the uniform tracking information (where the estimated time of arrival is used as the estimated delivery time in the uniform tracking information) to be rendered in standard format on the user interface of the user device (block 470).

In many embodiments, in addition to provide the uniform tracking information in response to the user tracking request, method 400 also can provide a notice regarding the grocery delivery. In some embodiments, with an authorization provided in the user tracking request, method 400 can push the notice regarding the grocery delivery to the user device more than once, including at every major milestones of the grocery deliver, such as when the drive is selected, when the grocery order has been picked up, and when the grocery delivery has been completed, etc., or when an exception occurs, such as the driver is stuck in traffic which can cause more delay, etc. Examples of such notice in these embodiments can include emails, text messages, computer-generated voice messages, and so forth. In many embodiments, the notice can comprise information regarding the grocery order and other information from the uniform tracking information, such as the delivery status, the driver name, the driver geographic location, and/or the estimated arrival time, selected from the estimated time of arrival and the estimated delivery time, etc. In some embodiments, the notice can comprise a URL (universal resource locator) to activate the user interface of the user device to display the aforementioned information.

In some embodiments, upon authorization provided in the user tracking request, method 400 can be configured to provide the uniform tracking information by streaming a computer-generated voice message about the tracked grocery delivery to the user device, such as user device 340 (FIG. 3). In these embodiments, the computer-generated voice message can be generated in real time based on the uniform tracking information and like the notice elaborated above, can comprise information about the grocery order, the delivery status, the driver name, the driver geographic location, and/or the estimated arrival time, selected from the estimated time of arrival and the estimated delivery time, etc. In many embodiments, method 400 can adopt any suitable speech synthesizer to generate the computer-generated voice message, and the speech synthesizer can be pre-programed or trained by a machine learning module and can be implemented by any suitable technologies, such as concatenation synthesis, unit selection synthesis, domain-specific synthesis, HMM-based synthesis, deep learning, etc. In other embodiments, method 400 can be configured to use a third-party speech synthesis system to generate and/or stream the computer-generated voice message to the user device.

Figure 7:
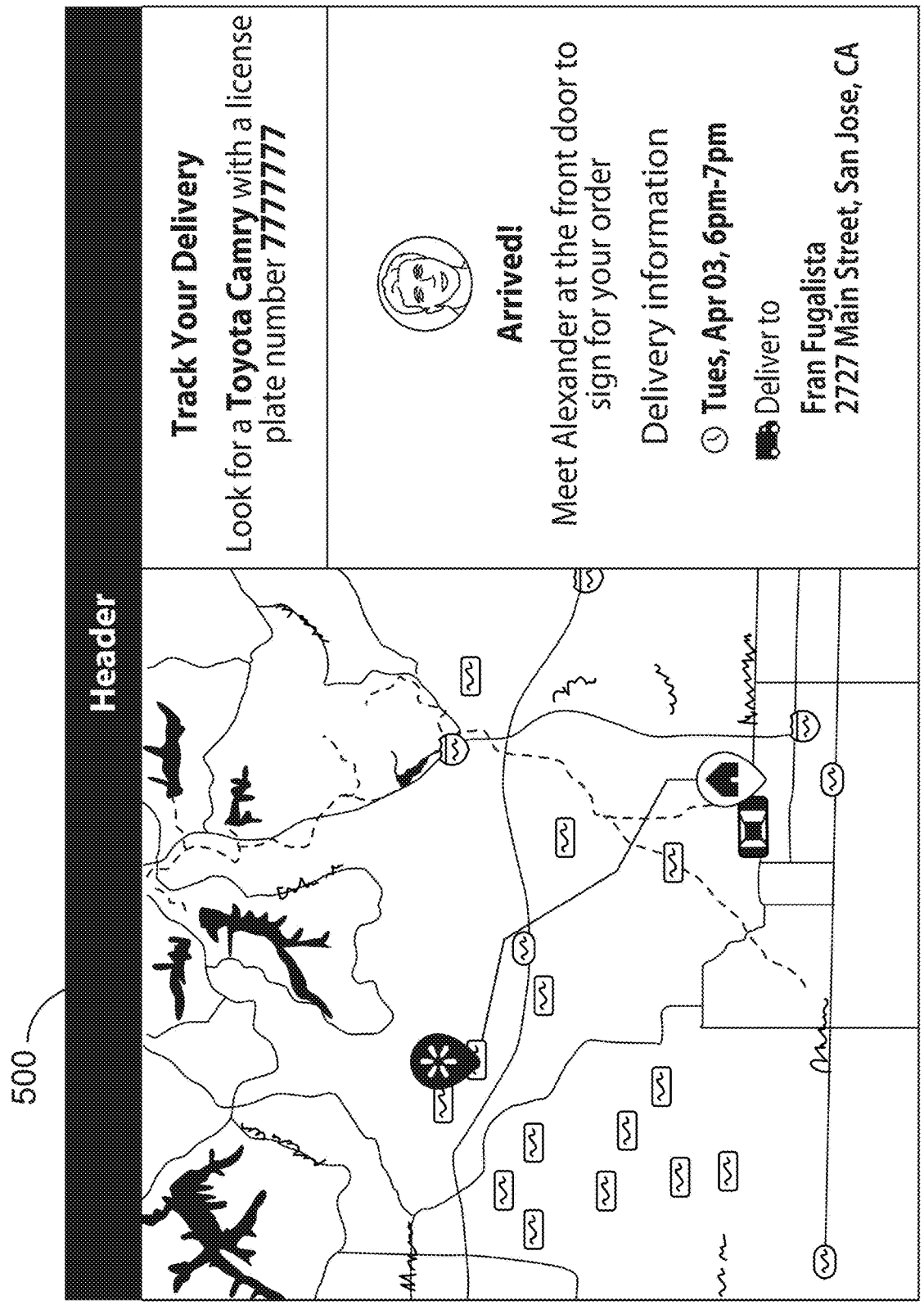
FIG. 7 illustrates a subsequent view of the exemplary user interface of FIG. 5 for tracking the grocery delivery, after the grocery delivery is completed.
Figure 8:
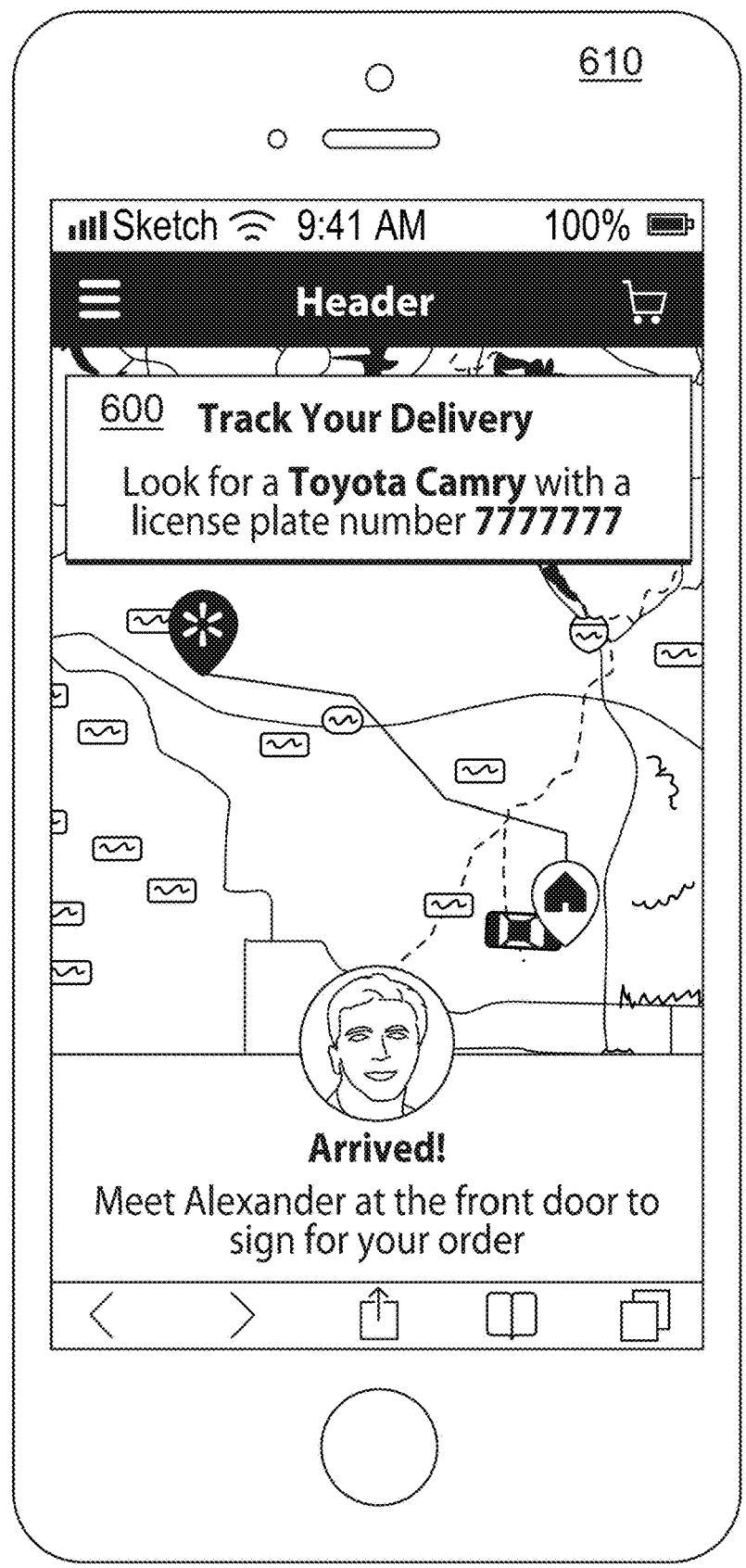
FIG. 8 illustrates a subsequent view of the exemplary user interface of FIG. 6 for tracking the grocery delivery, after the grocery delivery is completed.

Turning ahead in the drawings, FIGS. 5-8 illustrate user interfaces 500 and 600 for tracking a grocery delivery, according to another embodiment. In many embodiments, multiple types of user interfaces, such as user interfaces 500 and 600, can be provided to adapt to various types of user devices, such as computer system 100 (FIG. 1) or user device 340 (FIG. 3). For example, in this embodiment shown in FIG. 5, user interface 500 can be designed to be rendered on a user device with a relatively large screen, such as a personal computer, a laptop, or a tablet, and comprise a webpage or an app configured to show the real-time tracking status of the grocery delivery, including the information, and/or indications, of the order, the driver, the vehicle, the recipient, the destination, the delivery route, the estimated time of arrival at the destination, and so forth. User interface 600, in the embodiment shown in FIG. 6, can be designed to be rendered on a user device, such as user device 610, with a relatively small screen, such as a cell phone, and also comprise a webpage or an app configured to show the tracking information, and/or indications, about the grocery delivery, such as the driver, the vehicle, the route of the delivery, the estimated time of arrival at the destination, and so on. As shown in FIGS. 7 and 8, user interfaces 500 and 600, respectfully, in these embodiments, are configured to show the updated real-time tracking status of the grocery delivery that the grocery delivery has arrived and is thus completed.

User interfaces 500 and 600 in FIGS. 5-8 are merely exemplary and are not limited to the embodiments presented herein. User interfaces 500 and 600 can be employed in many different embodiments or examples not specifically depicted or described herein. In other embodiments, the designs, the elements, and/or arrangements of the elements can be replaced by other suitable designs, elements, and/or arrangements of the elements of user interfaces 500 and 600. In many embodiments, grocery system 310 (FIG. 3), front end 3160 (FIG. 3), and/or method 400 (FIG. 4) can be suitable to adopt user interface 500, user interface 600, and/or one or more of the designs, elements, or arrangements of the elements of user interface 500 and/or 600.

In an embodiment, a system can comprise one or more processors; and one or more non-transitory computer-readable media storing computing instructions. In this embodiment, the computing instructions can be configured to run on the one more processors and perform a method for providing a uniform tracking information for a grocery delivery of a grocery order, in response to a user tracking request. In this embodiment, the method performed in this system can comprise receiving a user tracking request from a customer via a user interface of a user device. The user tracking request can be related to a grocery delivery of a grocery order or a delivery of a general order made online or by phone. In this embodiment, the grocery delivery is to be sent from a grocery store location of a grocery store to a destination location. In this embodiment, the driver can be selected, from a delivery driver network of multiple delivery driver networks, for the grocery delivery. In this embodiment, different ones of the multiple delivery driver networks can use different hardware and software platforms, and the delivery driver network uses a platform of the different hardware and software platforms.

In this embodiment, the method performed in this system can comprise receiving driver tracking information for the grocery delivery from the platform of the delivery driver network, and the driver tracking information can comprises (a) a delivery route of the driver from the grocery store location to the destination location and (b) a driver geographic location of the driver, etc. When the driver tracking information is in a non-standard format, dependent on the platform of the delivery driver network, the method in this embodiment can further comprise converting the driver tracking information into uniform tracking information in a standard format. In this embodiment, the method can comprise providing, in real time, the uniform tracking information, to be rendered in the standard format on the user interface of the user device. In this embodiment, the uniform tracking information is for the grocery delivery and can be generated based on the driver tracking information and real-time traffic information of a geographic area that comprises the destination location, the grocery store location, the delivery route of the driver tracking information, and the driver geographic location of the driver tracking information.

In this embodiment, the method is configured to generate the uniform tracking information by: incorporating into the uniform tracking information either (a) an estimated time of arrival, determined by the method, based on the driver geographic location, the delivery route, and the real-time traffic information of the geographic area (i.e., the estimated time of arrival is the estimated delivery time in the uniform tracking information); or (b) the estimated delivery time of the driver tracking information. When the driver tracking information received from the platform of the delivery driver network does not comprise any estimated delivery time, the method in this embodiment incorporates the estimated time of arrival into the uniform tracking information, where the estimated time of arrival is used as the estimated delivery time in the uniform tracking information.

When the driver tracking information comprises the estimated delivery time, the method in this embodiment is configured to: verify the estimated delivery time by comparing the estimated delivery time and the estimated time of arrival to determine a first difference between the estimated delivery time and the estimated time of arrival; when the estimated delivery time is verified, incorporate the estimated delivery time into the uniform tracking information; and when the estimated delivery time is not verified, incorporating the estimated time of arrival into the uniform tracking information (where the estimated time of arrival is used as the estimated delivery time in the uniform tracking information).

Various embodiments can include a system comprising one or more processors; and one or more processors; and one or more non-transitory computer-readable media storing computing instructions that, when run on the one or more processors, cause the one or more processors to perform one or more acts. The acts can include receiving driver tracking information for a grocery delivery from a platform of a delivery driver network of multiple delivery driver networks, wherein the driver tracking information comprises (a) a delivery route of a driver and (b) a driver geographic location of the driver. The acts further can include determining a platform-dependent format of the driver tracking information based on the platform of the delivery driver network. Moreover, the acts can include when the platform-dependent format is different from a standard format, converting the driver tracking information from the platform-dependent format into uniform tracking information in the standard format.

Furthermore, the acts can include determining an estimated time of arrival based on the driver geographic location, the delivery route, and real-time traffic information of a geographic area. The acts also can include verifying a reliability of an estimated delivery time of the driver tracking information comprising: determining a first difference between (a) the estimated delivery time of the driver tracking information and (b) the estimated time of arrival; comparing the first difference with a discrepancy threshold, wherein the discrepancy threshold is greater than zero; when the first difference is less than the discrepancy threshold, determining the reliability of the estimated delivery time as verified; and when the first difference is greater than the discrepancy threshold, determining the reliability of the estimated delivery time as not verified.

In addition, the acts can include when the reliability of the estimated delivery time is verified, incorporating the estimated delivery time into the uniform tracking information. The acts further can include when the reliability of the estimated delivery time is not verified, incorporating the estimated time of arrival into the uniform tracking information as the estimated delivery time, wherein the estimated time of arrival is the estimated delivery time in the uniform tracking information. In addition, the acts can include providing the uniform tracking information to be rendered on a user interface of a user device.

Various embodiments further can include a method being implemented via execution of computing instructions configured to run at one or more processors and stored at one or more non-transitory computer-readable media. The method can include receiving driver tracking information for a grocery delivery from a platform of a delivery driver network of multiple delivery driver networks, wherein the driver tracking information comprises (a) a delivery route of a driver and (b) a driver geographic location of the driver. The method also can include determining a platform-dependent format of the driver tracking information based on the platform of the delivery driver network. The method further can include when the platform-dependent format is different from a standard format, converting the driver tracking information from the platform-dependent format into uniform tracking information in the standard format.

Furthermore, the acts can include determining an estimated time of arrival based on the driver geographic location, the delivery route, and real-time traffic information of a geographic area. The method further can include verifying a reliability of an estimated delivery time of the driver tracking information comprising: determining a first difference between (a) the estimated delivery time of the driver tracking information and (b) the estimated time of arrival; comparing the first difference with a discrepancy threshold, wherein the discrepancy threshold is greater than zero; when the first difference is less than the discrepancy threshold, determining the reliability of the estimated delivery time as verified; and when the first difference is greater than the discrepancy threshold, determining the reliability of the estimated delivery time as not verified.

Moreover, the method can include when the reliability of the estimated delivery time is verified, incorporating the estimated delivery time into the uniform tracking information. The method further can include when the reliability of the estimated delivery time is not verified, incorporating the estimated time of arrival into the uniform tracking information as the estimated delivery time, wherein the estimated time of arrival is the estimated delivery time in the uniform tracking information. The acts also can include providing the uniform tracking information to be rendered on a user interface of a user device.

Various embodiments further can include a non-transitory computer readable storage medium storing one or more computing instructions that, when run on one or more processors, cause the one or more processors to perform one or more acts. The acts can include receiving driver tracking information for a grocery delivery from a platform of a delivery driver network of multiple delivery driver networks, wherein the driver tracking information comprises (a) a delivery route of a driver and (b) a driver geographic location of the driver. The acts also can include determining a platform-dependent format of the driver tracking information based on the platform of the delivery driver network. In addition, the acts can include when the platform-dependent format is different from a standard format, converting the driver tracking information from the platform-dependent format into uniform tracking information in the standard format.

Further, the acts can include determining an estimated time of arrival based on the driver geographic location, the delivery route, and real-time traffic information of a geographic area. The acts also can include verifying a reliability of an estimated delivery time of the driver tracking information comprising: determining a first difference between (a) the estimated delivery time of the driver tracking information and (b) the estimated time of arrival; comparing the first difference with a discrepancy threshold, wherein the discrepancy threshold is greater than zero; when the first difference is less than the discrepancy threshold, determining the reliability of the estimated delivery time as verified; and when the first difference is greater than the discrepancy threshold, determining the reliability of the estimated delivery time as not verified.

Additionally, the acts can include when the reliability of the estimated delivery time is verified, incorporating the estimated delivery time into the uniform tracking information. The acts also can include when the reliability of the estimated delivery time is not verified, incorporating the estimated time of arrival into the uniform tracking information as the estimated delivery time, wherein the estimated time of arrival is the estimated delivery time in the uniform tracking information. The acts further can include providing the uniform tracking information to be rendered on a user interface of a user device.

In many embodiments, the techniques described herein can provide a practical application and several technological improvements. In some embodiments, the techniques described herein can provide uniform tracking information, including an improved, reliable estimated delivery time. Furthermore, in some embodiments where an estimated speed of the driver is determined, the system can provide a more accurate estimation of the time of arrival. For example, in some embodiments, when the driver geolocation location remains unchanged for a predetermined period, due to loss of connection between the driver and the delivery driver network, or when the system of the embodiments is disconnected with the system of the delivery driver network, the system can further use the latest estimated speed of the driver, before the anomaly happens, to determine the driver geographic location and continue providing updated uniform tracking information.

In many embodiments, the techniques described herein can advantageously provide a consistent user experience by providing an integrated user interfaces for a customer to receive uniform tracking information and a reliable estimated delivery time, regardless of which driver delivery network is used to deliver the order. In addition, the techniques described herein can advantageously retain the customer at the website or app provided by the grocery store by providing the driver tracking information, provided by the multiple delivery driver networks that are separate from the system, to be rendered on the same webpages or app, rather than directing the customer to the separate systems of the delivery driver networks and causing unnecessary confusion and inconsistent user experience.

In many embodiments, the techniques described herein can be used continuously at a scale that cannot be handled using manual techniques. For example, the number of grocery deliveries in the system can exceed many thousands per day.

Furthermore, the techniques described herein can solve a technical problem that arises only within the realm of computer networks, as online orders does not exist outside the realm of computer networks. Moreover, the techniques described herein can solve a technical problem that cannot be solved outside the context of computer networks. Specifically, receiving driver tracking information from different platforms of multiple delivery driver networks cannot be performed without a computer.

In a number of embodiments, the techniques described herein can solve a technical problem that arises only within the realm of computer networks, as online grocery orders and their deliveries do not exist outside the realm of computer networks. Moreover, the techniques described herein can solve a technical problem that cannot be solved outside the context of computer networks. Specifically, the techniques described herein cannot be used outside the context of computer networks, in view of the enormous amount of orders, deliveries, delivery driver information, and other data that must be received, transmitted, organized, updated, and managed in a short time period.

Although systems and methods for providing uniform tracking information for a grocery delivery of a grocery order have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-8 may be modified, and that the foregoing discussion of certain of these embodiments does not necessarily represent a complete description of all possible embodiments. For example, one or more of the procedures, processes, or activities in the blocks of FIG. 4 may include different procedures, processes, activities, and/or blocks and may be performed by many different components in many different orders. As yet another example, the grocery store and grocery order can be replaced by a general retail store and a general retail order.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory computer-readable media storing computing instructions that, when run on the one or more processors, cause the one or more processors to perform:
   receiving driver tracking information for a grocery delivery from a platform of a delivery driver network of multiple delivery driver networks, wherein the driver tracking information comprises (a) a delivery route of a driver and (b) a driver geographic location of the driver;
   determining a platform-dependent format of the driver tracking information based on the platform of the delivery driver network;
   when the platform-dependent format is different from a standard format, converting the driver tracking information from the platform-dependent format into uniform tracking information in the standard format;
   determining an estimated time of arrival based on an estimated speed of the driver, the driver geographic location, the delivery route, and real-time traffic information of a geographic area, wherein:
   the estimated speed of the driver is further determined based in part on: (a) the driver geographic location, (b) a prior driver geographic location of a prior driver tracking information received from the platform of the delivery driver network, (c) a timestamp of the driver tracking information, and (d) a prior timestamp of the prior driver tracking information; and
   the timestamp is greater than the prior timestamp;

verifying a reliability of an estimated delivery time of the driver tracking information comprising:
  determining a first difference between (a) the estimated delivery time of the driver tracking information received from the platform of the delivery driver network and (b) the estimated time of arrival, as determined;
  comparing the first difference with a discrepancy threshold;
  when the first difference is less than the discrepancy threshold, determining the reliability of the estimated delivery time as verified; and
  when the first difference is greater than the discrepancy threshold, determining the reliability of the estimated delivery time as not verified;
when the reliability of the estimated delivery time is verified, incorporating the estimated delivery time into the uniform tracking information;
when the reliability of the estimated delivery time is not verified, incorporating the estimated time of arrival into the uniform tracking information as the estimated delivery time; and
providing the uniform tracking information to be rendered on a user interface of a user device.

2. The system of claim 1, wherein verifying the reliability of the estimated delivery time further comprises:
when the reliability of the estimated delivery time, as determined, is not verified:
  updating the driver tracking information from the platform of the delivery driver network;
  when the driver tracking information is in the platform-dependent format, converting the driver tracking information, as updated, into the uniform tracking information in the standard format;
  determining an updated estimated time of arrival based on: (a) the driver geographic location of the driver tracking information, as updated, (b) the delivery route of the driver tracking information, as updated, and (c) the real-time traffic information of the geographic area;
  comparing the estimated delivery time and the updated estimated time of arrival to determine a second difference between the estimated delivery time and the updated estimated time of arrival;
  comparing the second difference to the discrepancy threshold;
  comparing the estimated delivery time, as updated, and the updated estimated time of arrival to determine a third difference between the estimated delivery time, as updated, and the updated estimated time of arrival;
  comparing the third difference to the discrepancy threshold;
  when the second difference is greater than the discrepancy threshold and when the third difference is greater than the discrepancy threshold, returning the reliability of the estimated delivery time as not verified; and
  when the second difference is less than the discrepancy threshold or when the third difference is less than the discrepancy threshold, returning the reliability of the estimated delivery time as verified.

3. The system of claim 1, wherein the computing instructions, when run on the one or more processors, further cause the one or more processors to perform:
providing a notice regarding the grocery delivery to be rendered on the user interface of the user device,
wherein:
  the notice is selected from one of: an email, a text message, or a computer-generated voice message; and
  the notice is associated with at least one of:
    a grocery order;
    a delivery status of the uniform tracking information;
    a driver name of the uniform tracking information;
    the driver geographic location of the uniform tracking information; or
    the estimated delivery time of the uniform tracking information.

4. The system of claim 1, wherein:
providing the uniform tracking information to be rendered on the user interface of the user device further comprises streaming a computer-generated voice message to the user device;
the computer-generated voice message is generated in real time based on the uniform tracking information; and
the computer-generated voice message is associated with at least one of:
  a grocery order;
  a delivery status of the uniform tracking information;
  a driver name of the uniform tracking information;
  the driver geographic location of the uniform tracking information; or
  the estimated delivery time of the uniform tracking information.

5. The system of claim 1, wherein:
the driver tracking information comprises driver information of the driver;
the driver information of the driver is incorporated into the uniform tracking information to be rendered on the user interface of the user device; and
the driver information comprising at least one of: a driver name, a driver photograph, or a vehicle information.

6. The system of claim 1, wherein:
receiving the driver tracking information for the grocery delivery from the platform of the delivery driver network and providing the uniform tracking information to be rendered on the user interface of the user device occur no less than twice per minute.

7. The system of claim 1, wherein:
the user interface of the user device further comprises one or more control elements for a customer to enter one or more input options for a user tracking request; and
the one or more input options include a push-notice frequency.

8. A method being implemented via execution of computing instructions configured to run at one or more processors and stored at one or more non-transitory computer-readable media, the method comprising:
receiving driver tracking information for a grocery delivery from a platform of a delivery driver network of multiple delivery driver networks, wherein the driver tracking information comprises (a) a delivery route of a driver and (b) a driver geographic location of the driver;
determining a platform-dependent format of the driver tracking information based on the platform of the delivery driver network;
when the platform-dependent format is different from a standard format, converting the driver tracking information from the platform-dependent format into uniform tracking information in the standard format;

determining an estimated time of arrival based on an estimated speed of the driver, the driver geographic location, the delivery route, and real-time traffic information of a geographic area, wherein:
the estimated speed of the driver is further determined based in part on: (a) the driver geographic location, (b) a prior driver geographic location of a prior driver tracking information received from the platform of the delivery driver network, (c) a timestamp of the driver tracking information, and (d) a prior timestamp of the prior driver tracking information; and
the timestamp is greater than the prior timestamp;
verifying a reliability of an estimated delivery time of the driver tracking information comprising:
determining a first difference between (a) the estimated delivery time of the driver tracking information received from the platform of the delivery driver network and (b) the estimated time of arrival, as determined;
comparing the first difference with a discrepancy threshold;
when the first difference is less than the discrepancy threshold, determining the reliability of the estimated delivery time as verified; and
when the first difference is greater than the discrepancy threshold, determining the reliability of the estimated delivery time as not verified;
when the reliability of the estimated delivery time is verified, incorporating the estimated delivery time into the uniform tracking information;
when the reliability of the estimated delivery time is not verified, incorporating the estimated time of arrival into the uniform tracking information as the estimated delivery time; and
providing the uniform tracking information to be rendered on a user interface of a user device.

9. The method of claim 8, wherein verifying the reliability of the estimated delivery time further comprises:
when the reliability of the estimated delivery time, as determined, is not verified:
updating the driver tracking information from the platform of the delivery driver network;
when the driver tracking information is in the platform-dependent format, converting the driver tracking information, as updated, into the uniform tracking information in the standard format;
determining an updated estimated time of arrival based on: (a) the driver geographic location of the driver tracking information, as updated, (b) the delivery route of the driver tracking information, as updated, and (c) the real-time traffic information of the geographic area;
comparing the estimated delivery time and the updated estimated time of arrival to determine a second difference between the estimated delivery time and the updated estimated time of arrival;
comparing the second difference to the discrepancy threshold;
comparing the estimated delivery time, as updated, and the updated estimated time of arrival to determine a third difference between the estimated delivery time, as updated, and the updated estimated time of arrival;
comparing the third difference to the discrepancy threshold;
when the second difference is greater than the discrepancy threshold and when the third difference is greater than the discrepancy threshold, returning the reliability of the estimated delivery time as not verified; and
when the second difference is less than the discrepancy threshold or when the third difference is less than the discrepancy threshold, returning the reliability of the estimated delivery time as verified.

10. The method of claim 8 further comprising:
providing a notice regarding the grocery delivery to be rendered on the user interface of the user device,
wherein:
the notice is selected from one of: an email, a text message, or a computer-generated voice message; and
the notice is associated with at least one of:
a grocery order;
a delivery status of the uniform tracking information;
a driver name of the uniform tracking information;
the driver geographic location of the uniform tracking information; or
the estimated delivery time of the uniform tracking information.

11. The method of claim 8, wherein:
providing the uniform tracking information to be rendered on the user interface of the user device further comprises streaming a computer-generated voice message to the user device;
the computer-generated voice message is generated in real time based on the uniform tracking information; and
the computer-generated voice message is associated with at least one of:
a grocery order;
a delivery status of the uniform tracking information;
a driver name of the uniform tracking information;
the driver geographic location of the uniform tracking information; or
the estimated delivery time of the uniform tracking information.

12. The method of claim 8, wherein:
the driver tracking information comprises driver information of the driver;
the driver information of the driver is incorporated into the uniform tracking information to be rendered on the user interface of the user device; and
the driver information comprising at least one of: a driver name, a driver photograph, or a vehicle information.

13. The method of claim 8, wherein:
receiving the driver tracking information for the grocery delivery from the platform of the delivery driver network and providing the uniform tracking information to be rendered on the user interface of the user device occur no less than twice per minute.

14. The method of claim 8, wherein:
the user interface of the user device further comprises one or more control elements for a customer to enter one or more input options for a user tracking request; and
the one or more input options include a push-notice frequency.

15. A non-transitory computer readable storage medium storing one or more computing instructions that, when run on one or more processors, cause the one or more processors to perform:
receiving driver tracking information for a grocery delivery from a platform of a delivery driver network of multiple delivery driver networks, wherein the driver tracking information comprises (a) a delivery route of a driver and (b) a driver geographic location of the driver;

determining a platform-dependent format of the driver tracking information based on the platform of the delivery driver network;

when the platform-dependent format is different from a standard format, converting the driver tracking information from the platform-dependent format into uniform tracking information in the standard format;

determining an estimated time of arrival based on an estimated speed of the driver, the driver geographic location, the delivery route, and real-time traffic information of a geographic area, wherein:
  the estimated speed of the driver is further determined based in part on: (a) the driver geographic location, (b) a prior driver geographic location of a prior driver tracking information received from the platform of the delivery driver network, (c) a timestamp of the driver tracking information, and (d) a prior timestamp of the prior driver tracking information; and
  the timestamp is greater than the prior timestamp;

verifying a reliability of an estimated delivery time of the driver tracking information comprising:
  determining a first difference between (a) the estimated delivery time of the driver tracking information received from the platform of the delivery driver network and (b) the estimated time of arrival, as determined;
  comparing the first difference with a discrepancy threshold;
  when the first difference is less than the discrepancy threshold, determining the reliability of the estimated delivery time as verified; and
  when the first difference is greater than the discrepancy threshold, determining the reliability of the estimated delivery time as not verified;

when the reliability of the estimated delivery time is verified, incorporating the estimated delivery time into the uniform tracking information;

when the reliability of the estimated delivery time is not verified, incorporating the estimated time of arrival into the uniform tracking information as the estimated delivery time; and providing the uniform tracking information to be rendered on a user interface of a user device.

16. The non-transitory computer readable storage medium of claim 15, wherein verifying the reliability of the estimated delivery time further comprises:
  when the reliability of the estimated delivery time, as determined, is not verified:
    updating the driver tracking information from the platform of the delivery driver network;
    when the driver tracking information is in the platform-dependent format, converting the driver tracking information, as updated, into the uniform tracking information in the standard format;
    determining an updated estimated time of arrival based on: (a) the driver geographic location of the driver tracking information, as updated, (b) the delivery route of the driver tracking information, as updated, and (c) the real-time traffic information of the geographic area;
    comparing the estimated delivery time and the updated estimated time of arrival to determine a second difference between the estimated delivery time and the updated estimated time of arrival;
    comparing the second difference to the discrepancy threshold;
    comparing the estimated delivery time, as updated, and the updated estimated time of arrival to determine a third difference between the estimated delivery time, as updated, and the updated estimated time of arrival;
    comparing the third difference to the discrepancy threshold;
    when the second difference is greater than the discrepancy threshold and when the third difference is greater than the discrepancy threshold, returning the reliability of the estimated delivery time as not verified; and
    when the second difference is less than the discrepancy threshold or when the third difference is less than the discrepancy threshold, returning the reliability of the estimated delivery time as verified.

17. The non-transitory computer readable storage medium of claim 15, wherein the one or more computing instructions, when run on the one or more processors, further cause the one or more processors to perform:
  providing a notice regarding the grocery delivery to be rendered on the user interface of the user device, wherein:
    the notice is selected from one of: an email, a text message, or a computer-generated voice message; and
    the notice is associated with at least one of:
      a grocery order;
      a delivery status of the uniform tracking information;
      a driver name of the uniform tracking information;
      the driver geographic location of the uniform tracking information; or
      the estimated delivery time of the uniform tracking information.

18. The non-transitory computer readable storage medium of claim 15, wherein:
  the user interface of the user device further comprises one or more control elements for a customer to enter one or more input options for a user tracking request; and
  the one or more input options include a push-notice frequency.

19. The non-transitory computer readable storage medium of claim 15, wherein:
  providing the uniform tracking information to be rendered on the user interface of the user device further comprises streaming a computer-generated voice message to the user device;
  the computer-generated voice message is generated in real time based on the uniform tracking information; and
  the computer-generated voice message is associated with at least one of:
    a grocery order;
    a delivery status of the uniform tracking information;
    a driver name of the uniform tracking information;
    the driver geographic location of the uniform tracking information; or
    the estimated delivery time of the uniform tracking information.

20. The non-transitory computer readable storage medium of claim 15, wherein:
  the driver tracking information comprises driver information of the driver;

the driver information of the driver is incorporated into the uniform tracking information to be rendered on the user interface of the user device; and the driver information comprising at least one of: a driver name, a driver photograph, or a vehicle information.

21. The non-transitory computer readable storage medium of claim 15, wherein:

receiving the driver tracking information for the grocery delivery from the platform of the delivery driver network and providing the uniform tracking information to be rendered on the user interface of the user device occur no less than twice per minute.

* * * * *